(12) United States Patent
Naganathan

(10) Patent No.: US 10,521,313 B2
(45) Date of Patent: Dec. 31, 2019

(54) UNINTERRUPTED DATA AVAILABILITY DURING FAILURE IN REDUNDANT MICRO-CONTROLLER SYSTEM

(71) Applicant: STEERING SOLUTIONS IP HOLDING CORPORATION, Saginaw, MI (US)

(72) Inventor: Vinod Shankar Naganathan, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 185 days.

(21) Appl. No.: 15/662,961

(22) Filed: Jul. 28, 2017

(65) Prior Publication Data

US 2018/0032413 A1 Feb. 1, 2018

Related U.S. Application Data

(60) Provisional application No. 62/367,791, filed on Jul. 28, 2016.

(51) Int. Cl.
*G06F 11/00* (2006.01)
*G06F 11/16* (2006.01)
*G06F 11/20* (2006.01)

(52) U.S. Cl.
CPC ...... *G06F 11/1625* (2013.01); *G06F 11/2002* (2013.01); *G06F 11/2038* (2013.01); *G06F 2201/88* (2013.01)

(58) Field of Classification Search
CPC .. G06F 11/1625; G06F 11/16; G06F 11/2002; G06F 11/2038; G06F 11/0739; G06F 11/2035; G06F 11/2023; G06F 11/2028; G06F 2201/88
See application file for complete search history.

(56) References Cited

U.S. PATENT DOCUMENTS

| 5,957,985 A * | 9/1999 | Wong | G06F 11/2035 701/29.2 |
| 6,351,829 B1 * | 2/2002 | Dupont | G06F 11/0736 714/11 |
| 2009/0055679 A1 * | 2/2009 | Langford | G06F 11/2025 714/4.1 |

(Continued)

*Primary Examiner* — Joseph D Manoskey

(57) ABSTRACT

Technical solutions are described for providing a redundant processor. An example processing unit includes a source processor coupled with a system communication bus via a first communication line; a backup processor coupled with the system communication bus via a second communication line; and an inter-microprocessor communication channel for communication between the source processor and the backup processor. The backup processor monitors for a failure of the source processor by monitoring the first communication line for communication messages being transmitted by the source processor. The backup processor determines a failure of the source processor in response to an absence of the communication messages on the first communication line for a predetermined duration. The backup processor, in response to a failure of the source processor, takes over control of communication of the processing unit by sending a status update on the inter-microprocessor communication channel.

18 Claims, 8 Drawing Sheets

(56) References Cited

U.S. PATENT DOCUMENTS

2012/0265405 A1* 10/2012 Matsumura ....... B60W 50/0225
  701/45
2014/0082413 A1*  3/2014 Bilich ................. G06F 11/2041
  714/12
2014/0317440 A1* 10/2014 Biermayr ............ H04L 41/0668
  714/4.11
2016/0010582 A1*  1/2016 Mehr ..................... F02D 41/22
  701/110

* cited by examiner

IMC STATUS STRUCTURE:

| BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|
| TAKE CTRL PB2 | TAKE CTRL PB1 | DONT CTRL PB2 | DONT CTRL PB1 | REQ CTRL PB2 | REQ CTRL PB1 | BCKP CTRL PB2 | BCKP CTRL PB1 | SRCP CTRL PB2 | SRCP CTRL PB1 |

| BIT POSITION | BIT NAME | FUNCTION |
|---|---|---|
| BIT 0 | SRC CTRL PB1 | SOURCE MCU CONTROLLING PUBLIC BUS 1 |
| BIT 1 | SRC CTRL PB2 | SOURCE MCU CONTROLLING PUBLIC BUS 2 |
| BIT 2 | BCKP CTRL PB1 | BACKUP MCU CONTROLLING PUBLIC BUS 1 |
| BIT 3 | BCKP CTRL PB2 | BACKUP MCU CONTROLLING PUBLIC BUS 2 |
| BIT 4 | REQ CTRL PB1 | BACKUP MCU REQUESTING CONTROL OF PUBLIC BUS 1 |
| BIT 5 | REQ CTRL PB2 | BACKUP MCU REQUESTING CONTROL OF PUBLIC BUS 2 |
| BIT 6 | DONT CTRL PB1 | SOURCE MCU DENYING CONTROL OF PUBLIC BUS 1 |
| BIT 7 | DONT CTRL PB2 | SOURCE MCU DENYING CONTROL OF PUBLIC BUS 2 |
| BIT 8 | TAKE CTRL PB1 | SOURCE MCU REQUESTING BACKUP MCU TO TAKE CONTROL OF PUBLIC BUS 1 |
| BIT 9 | TAKE CTRL PB2 | SOURCE MCU REQUESTING BACKUP MCU TO TAKE CONTROL OF PUBLIC BUS 2 |

FIG. 8

UNINTERRUPTED DATA AVAILABILITY DURING FAILURE IN REDUNDANT MICRO-CONTROLLER SYSTEM

CROSS-REFERENCES TO RELATED APPLICATIONS

This patent application claims priority to U.S. Provisional Patent Application Ser. No. 62/367,791, filed Jul. 28, 2016, which is incorporated herein by reference in its entirety.

BACKGROUND

The present application generally relates to a processor architecture, and particularly to facilitate uninterrupted data availability during failure in a redundant micro-controller unit (MCU) based system.

Increasing vehicle safety requirements are driving system redundancy to achieve higher safety levels. Redundancy is typically achieved by proliferation of control system, to the extent of having redundant microcontrollers. However, using a system with redundant microcontrollers introduces multiple complexities in operation of the vehicle, including intra-vehicle communication using network bus such as a controller area network (CAN) bus such as a public CAN bus.

Typically, 2 MCUs are connected on the public CAN bus with multiple architectures for communicating the data that each of the MCU communicates. In one or more examples, both MCUs are connected to 2 different CAN buses and the same information is sent across both buses all the time. In this case, there will be no issue if one of the MCU fails as CAN information is redundantly available on the other CAN bus. But in this case, bus bandwidth is not utilized optimally because of the redundancy in CAN messages. Accordingly, in another approach, between the two MCUs, one MCU is used as a back-up for the other MCU. The back-up MCU sends CAN messages in the event of failure of the other MCU. Accordingly, a suitable methodology is required to identify an MCU failure and/or an MCU-CAN interface failure, and immediately activate the back-up MCU to take control of the CAN bus. The technical problems posed here include, robust detection of a CAN failure, smooth and quick switchover of CAN, smooth return of CAN bus control to the original MCU. Additionally, it is to be ensured that both the MCUs are not communicating together.

SUMMARY

Technical solutions are described for a microcontroller unit (MCU) system in a vehicle to provide robust, efficient, and consistent detection of a communication failure. The technical solutions further facilitate a smooth and quick takeover of control of communication by a backup MCUs in response to a failure condition of a source MCU. The technical solutions further facilitate a smooth return of control of the communication control to the source MCU upon failure recovery.

According to one or more embodiments, a processing unit for providing a redundant processor, the processing unit includes a source processor coupled with a system communication bus via a first communication line; a backup processor coupled with the system communication bus via a second communication line; and an inter-microprocessor communication channel for communication between the source processor and the backup processor. The backup processor monitors for a failure of the source processor by monitoring the first communication line for communication messages being transmitted by the source processor. The backup processor determines a failure of the source processor in response to an absence of the communication messages on the first communication line for a predetermined duration. The backup processor, in response to a failure of the source processor, takes over control of communication of the processing unit by sending a status update on the inter-microprocessor communication channel.

According to one or more embodiments, a method for uninterrupted data communication from a processing system includes monitoring, by a second processor, for a failure of a first processor by monitoring a first communication line associated with the first processor for communication messages being transmitted by the first processor. The method further includes determining, by the second processor, the failure of the first processor in response to an absence of the communication messages on the first communication line for a predetermined duration. The method further includes, in response to the failure of the first processor, taking over control of communication of the processing system by the second processor, by sending a status update on an inter-microprocessor communication channel between the first processor and the second processor.

According to one or more embodiments a computer program product including non-transitory computer storage medium that includes computer executable instructions, the computer executable instructions when executed by a processing system causes the processing system to: monitor, by a second processor of the processing system, for a failure of a first processor of the processing system by monitoring a first communication line associated with the first processor for communication messages being transmitted by the first processor; determine, by the second processor, the failure of the first processor in response to an absence of the communication messages on the first communication line for a predetermined duration; and in response to the failure of the first processor, take over control of communication of the processing system by the second processor, by sending a status update on an inter-microprocessor communication channel between the first processor and the second processor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 8 depicts an example inter-microcontroller communication status information data structure according to one or more embodiments.

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
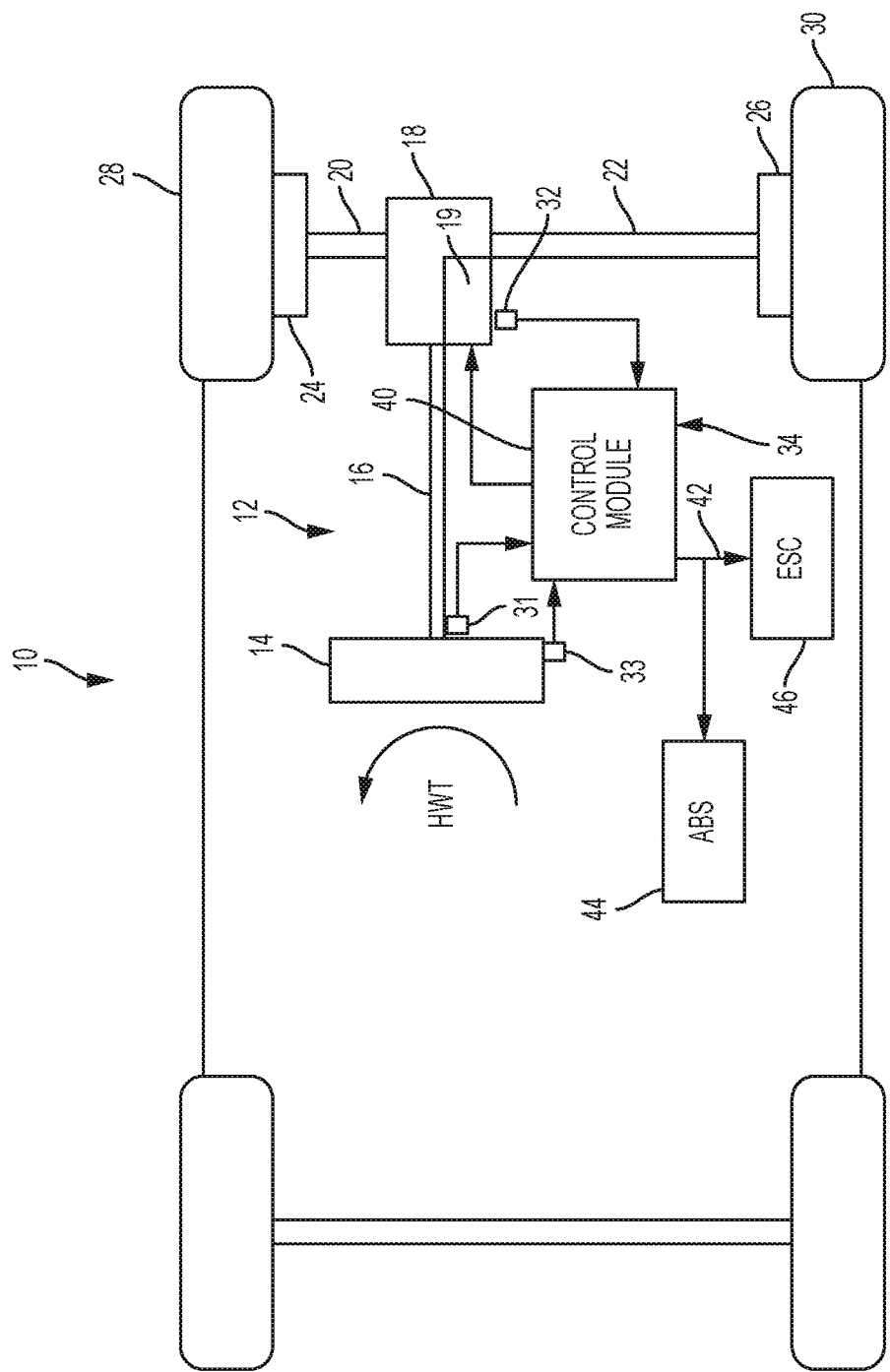
FIG. 1 illustrates an exemplary embodiment of a vehicle including a steering system.

Referring now to the FIG. 1 an exemplary embodiment of a vehicle 10 including a steering system 12 is depicted. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning as a control signal that can be used to control aspects of the steering system 12 through the steering assist unit 18.

In one or more examples, the control module 40 is an ECU operated by a real time operating system (RTOS). It should be noted that while a steering system 12 operated by an ECU is depicted here, the technical solutions described herein are applicable in various other settings, such as in other ECUs that operate other components of the vehicle 10, for example, engine, exhaust system, tire pressure monitor system, infotainment system, among others. Further yet, the applicability of the technical solutions is not limited to a vehicle, rather to any other field where a microcontroller is used, such as medical devices, industrial machines, and the like. Particularly, the technical solutions described herein are applicable to a microcontroller unit (MCU) that includes two or more microcontrollers that are used to provide redundancy.

Figure 2:
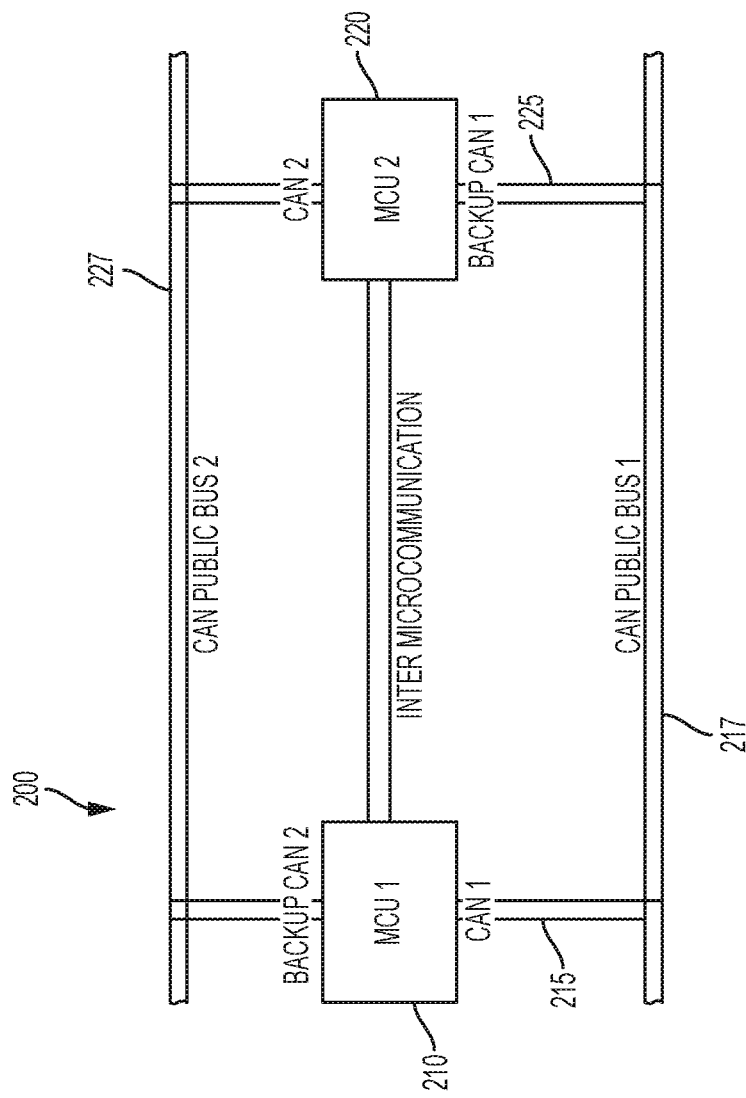
FIG. 2 illustrates an example redundant microcontroller unit (MCU) system according to one or more embodiments.

FIG. 2 illustrates an example redundant MCU system 200 according to one or more embodiments. The depicted MCU system 200 is depicted in a context of the vehicle 10, where communication to/from the MCU architecture 200 is performed using one or more controller area network (CAN) buses. Further, in the illustrated MCU architecture 200, two microcontrollers are used to provide redundancy. It should be noted that in other implementations the MCU system 200 can include additional microcontrollers. The MCUs of the MCU system 200 are internally connected by an inter-micro communication (IMC) to share information among each other, such as status information.

In the depicted example, MCU-2 220 acts as a backup for the MCU-1 210, and vice versa, during CAN communication failure. Accordingly, other nodes that are connected via the CAN bus continue receiving information (that is, ensuring data availability to the other nodes) from the MCU architecture 200. Typically, the MCU that owns a CAN communication in a particular bus is referred to as a source MCU and the MCU that provides backup for the CAN communication is referred to as the backup MCU. A source MCU of one bus will act as the backup ECU for the other bus.

For example, in FIG. 2, consider a first case where the MCU-1 210 is the source MCU that owns communication over CAN bus-1 215, and the MCU-2 220 is the backup MCU for the communication that it receives via CAN bus-2 225. In another case the MCU-2 220 is the source MCU that owns communication over the CAN bus-2 225, and the MCU-1 210 is the backup MCU with communication received via the CAN bus-1 215. The CAN bus-1 215 and the CAN bus-2 225 are connected to corresponding public CAN buses, public CAN bus-1 217 and public CAN bus-2 227.

The CAN communication may be stopped because of a failure such as an issue with a CAN transceiver, an MCU power down, an MCU reset due to failure, a disconnection in CAN bus line locally at the MCU, a short in a CAN bus line locally at the MCU, an application specific disabling of CAN communication, and the like. It is understood that the above are a few examples, and that the CAN communication may be interrupted by other failures.

The technical solutions described herein facilitate detecting a CAN failure, backing up CAN communication, and returning CAN bus control to the source MCU on failure recovery. The technical solutions further facilitate ensuring that there is no instance where all MCUs from the MCU system 200 communicate the same CAN message. For example, referring to FIG. 2, the two MCUs of the MCU system 200 may communicate the same message at least in the following cases. For example, a delayed CAN communication in the source MCU can be detected as an MCU failure at the backup MCU. Additionally, or alternatively, a bus off during recovery in the source MCU can be detected as a failure at the backup MCU. Additionally, or alternatively if the source MCU resets, which results in no CAN communication for a period, the backup MCU can deem a CAN bus failure. It should be noted that in the above examples the source MCU can be the MCU-1 210 and the backup MCU the MCU-2 220, or vice versa. The technical solutions described herein overcome such scenarios and facilitate an uninterrupted data availability during failure in a redundant MCU system 200.

In one or more examples, the technical solutions facilitate identifying a stoppage of CAN communication in the redundant MCU system 200. In the following description consider the MCU-1 210 is the source MCU and the MCU-2 220 is the backup MCU, noting that the same is applicable in the case where the MCU-2 220 acts as the source MCU and the MCU-1 210 is the backup MCU. For example, the CAN communication stoppage may be identified using three parameters. The first parameter may be an absence of CAN frame on the CAN bus from the source MCU. The second parameter may be an MCU status information conveyed between the MCUs of the MCU system 200 over the IMC 230. The third parameter may be a failure in CAN transmission detected at the source MCU/Bus-Off at the source MCU.

For example, the source MCU performs at least the following operations, among others. The source MCU checks for successful transmission confirmation for every frame it transmits. After consecutive n missed transmission confirmation, the source MCU transmits a status information via the inter micro communication channel 230 to indicate to the backup MCU to take over the CAN communication. Here, n is a predetermined integer, such as 5, 10, or any other. The source MCU stops transmission at this time. All CAN messages which were to be transmitted by the source MCU are marked as receivable by the source MCU (and marked as to be transmitted by the backup MCU). In case the receive capability of the source MCU is disabled, it is enabled at the source MCU at this time.

Additionally, or alternatively, on bus-off, the source MCU transmits a status information via the inter micro communication channel 230 to indicate to the backup MCU to take over the CAN communication. The source MCU stops transmission at this time. All CAN messages to be transmitted by the source MCU are marked as receivable at the source MCU and to be transmitted by the backup MCU. In case the receive capability is disabled, it is enabled at the source MCU at this time.

Additionally, the backup MCU performs at least the following operations, among others. All CAN messages to be transmitted by the source MCU are configured as source and receivable CAN messages for the backup MCU. In one or more examples, the transmission of messages by the backup MCU is disabled initially. When the backup MCU identifies a reception timeout or the CAN messages from the source MCU m times, the backup MCU checks the status of the source MCU via the IMC channel 230. Here, m is a predetermined integer, such as 5, 10, or the like. If the status information from the source MCU is available and if the status information is indicative that the source MCU's CAN communication is healthy, then the backup MCU takes no action but indicates to the source MCU over the IMC 230 that the backup MCU did not see the CAN messages.

Additionally, or alternatively, the backup MCU requests the source MCU to confirm that the source MCU is operating without a failure. If the source MCU responsively indicates that CAN communication is working without any failure, then the backup ECU concludes that there is a delay in transmission from the source MCU or on the bus. Alternatively, the backup MCU deems that the CAN line is faulty, and does not indicate any fault but continues polling for the CAN messages. Alternatively, the backup MCU deems that the CAN transmission was disabled because of application based disabling of CAN transmission at the source MCU, for example, a diagnostics based disabling of CAN communication.

Alternatively, if the status information from the source MCU is not available, then the backup MCU deems that the source MCU has powered down or is in reset. Accordingly, the backup MCU takes over control of the CAN bus. The backup MCU informs the source MCU via the IMC 230 that the backup MCU has taken over the CAN control.

Further, in case the status information from the source MCU is available and if the status information requests the backup MCU to take over the CAN communication, then the backup MCU takes over the CAN bus control, and informs the source MCU via the IMC 230 that it has taken over the CAN control.

Additionally, or alternatively, the backup MCU checks the status information over IMC and if the source MCU requests for a bus takeover, then the backup MCU takes over the CAN bus control, and updates the IMC information that it has taken over the CAN control.

All CAN messages transmitted by the source MCU are configured and marked as being owned by the source MCU and as CAN messages to be received by the backup MCU. The transmission capability of the backup MCU is disabled initially. Once backup support is requested, all the CAN messages are enabled for transmission and are started immediately. Reception of the messages is stopped immediately.

The technical solutions described herein further facilitate a handshaking between the source MCU and the back MCU to ensure a consistent handover of CAN communication responsibilities between the two MCUs. For example, the handshaking ensures return of CAN bus control to the source MCU on failure recovery.

For example, consider the following four cases where control of the communication bus has to be returned to the source MCU, case 1: bus-off recovery of the source MCU; case 2: new startup after a reset of the source MCU; case 3: application based re-enabling of CAN communication from the source MCU; and case 4: fault recovery of the source MCU.

For example, in case 1 of the bus-off recovery, on recovery from bus-off, the source MCU sends status via IMC 230 to return the CAN communication control. The source MCU waits for a feedback over the IMC 230 confirming that the backup MCU has stopped transmission. If the source MCU receives updated IMC information, then the source MCU continues to wait until receipt of confirmation from the backup MCU. The source MCU further receives CAN communication as sent by the backup MCU.

Table 1 illustrates the different cases and operations performed by the source MCU in such cases.

TABLE 1

| IMC Signal Availability | IMC status | CAN reception status | Action | Rationale |
|---|---|---|---|---|
| NO | X | NO CAN messages | Takes over control. Updates IMC status indicating control is taken. | This is a case where the backup MCU is powered down or could not communicate |
| NO | X | CAN messages seen | Waits until CAN messages have stopped | This is a case where the IMC line is down. |
| YES | Backup has Control | NO CAN messages | Waits until Backup MCU releases control | This is a case where source MCU is still not completely recovered from fault |
| YES | Backup has Control | CAN messages seen | Waits until Backup MCU releases control | Normal recovery case |
| YES | Backup has released control/ does not have control | NO CAN messages | Takes over control. Updates IMC status indicating control is taken. | Normal recovery case |
| YES | Backup has released control/ does not have control | CAN messages seen | Waits until CAN messages have stopped | This could be a transitional case or an error scenario |

Further, consider the case 2 of a new startup of the source MCU after a reset. At startup, the source MCU sets the reception capability of its CAN messages as activated and transmission as disabled. The source MCU reads the IMC status information and the status of CAN reception activity and acts as per table 2.

TABLE 2

| IMC Signal Availability | IMC status | CAN reception status | Action | Rationale |
|---|---|---|---|---|
| NO | X | NO CAN messages | Takes over control. Updates IMC status indicating control is taken. | Normal startup case |
| NO | X | CAN messages seen | Requests for release of control. Waits until CAN messages have stopped | This is a case where the IMC line is down. |
| YES | Backup has Control | NO CAN messages | Requests for release of control. Waits until Backup MCU releases control | This is a case where source MCU is still not completely recovered from fault |
| YES | Backup has Control | CAN messages seen | Requests for release of control. Waits until Backup MCU releases control | Normal recovery case |
| YES | Backup has released control/ does not have control | NO CAN messages | Takes over control. Updates IMC status indicating control is taken. | Normal startup case. |
| YES | Backup has released control/ does not have control | CAN messages seen | Requests for release of control Waits until CAN messages have stopped | This could be a transitional case or an error scenario |

Further, consider the case 3 of application based re-enabling of CAN communication from the source MCU. In one or more examples, on application based disabling request, the source MCU places all its CAN messages in reception mode. In this case, the backup MCU may not have taken control of the CAN communication. However, the source MCU may double check that this is the case before enabling communication. The source MCU reads the IMC status information and the status of CAN reception activity and acts as per table 3.

TABLE 3

| IMC Signal Availability | IMC status | CAN reception status | Action | Rationale |
|---|---|---|---|---|
| NO | X | NO CAN messages | Takes over control. Updates IMC status indicating control is taken. | IMC line would possibly be faulty or the backup MCU is powered down or in fault. |
| NO | X | CAN messages seen | Requests for release of control. Waits until CAN messages have stopped | This is a case where the IMC line is down. This is a faulty case where backup MCU has taken over control when it shouldn't have. Source MCU could flag a fault if required. |
| YES | Backup has Control | NO CAN messages | Requests for release of control. Waits until Backup MCU releases control | This is a faulty case where backup MCU has taken over control when it shouldn't have. Source MCU could flag a fault if required. |
| YES | Backup has Control | CAN messages seen | Requests for release of control. Waits until Backup MCU releases control | This is a faulty case where backup MCU has taken over control when it shouldn't have. Source MCU could flag a fault if required. |
| YES | Backup has released control/ does not have control | NO CAN messages | Takes over control. Updates IMC status indicating control is taken. | Normal case. |
| YES | Backup has released control/ does not have control | CAN messages seen | Requests for release of control. Waits until CAN messages have stopped | This is a faulty case where backup MCU has taken over control when it shouldn't have. Source MCU could flag a fault if required. |

In the case 4 of fault recovery, the source MCU and the backup MCU operate similar to the case of bus-off recovery (Table 1).

Further yet, in case of multiple MCUs experiencing failure, for example, if both the MCUs of the MCU system 200 identify problems in respective CAN communication buses, one or both of the MCUs report an error. For example, if an IMC status signal from the source MCU indicates to the backup MCU to take control of the CAN communication bus, and on taking the control, if the backup MCU identifies that its own transmission on the communication bus is unreachable, or if the backup MCU detects a bus off, then the backup MCU releases the control of the communication bus and reports an error. In one or more examples, upon detecting the control release by the back MCU, the source MCU also triggers an error reporting. Reporting the error by one of the MCUs includes sending a communication message indicative of the error.

Figure 3:
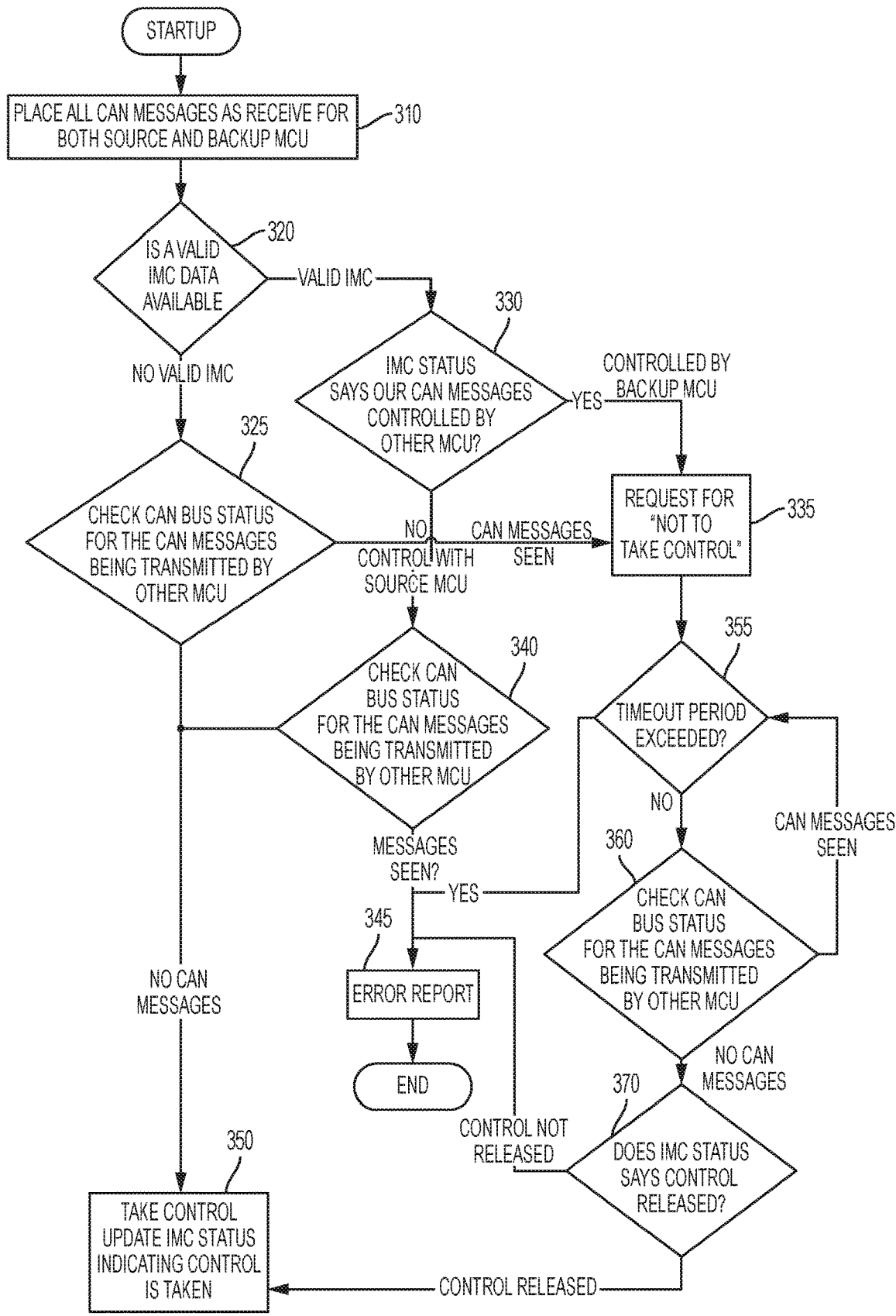
FIG. 3 illustrates a flowchart of an example method for startup of the MCU system according to one or more embodiments.

FIG. 3 illustrates a flowchart of an example method for startup of the MCU system 200 according to one or more embodiments. The description below is in context of the MCU system 200 equipped with two MCUs, however, it should be noted that the method is applicable to an MCU system 200 with additional MCUs. The MCU system 200 initially disables transmission of both, the MCU-1 210 and the MCU-2 220, as shown at 310. Disabling the transmission includes placing or marking the CAN messages as to be received by both the MCUs. Consider that the MCU-1 210 is to be started as the source MCU and the MCU-2 220 as the backup MCU at startup.

The source MCU checks the IMC channel 230 for IMC status information to determine if the MCU-1 210 is setup as the source MCU and the MCU-2 220 has been setup as the backup MCU. In one or more examples, the MCU-1 210 checks if the IMC status information of the MCU-1 210 is valid, as shown at 320. If the status information is valid, the MCU-1 210 further checks if the status information is indicative of the MCU-1 210 as the source MCU, as shown at 330. For example, if the MCU-1 210 is setup as the source MCU, the IMC status information indicates that the CAN messages of the MCU system 200 are controlled by the MCU-1 210.

If the IMC status information indicates that the MCU-2 220 controls the CAN messages of the MCU system 200, the MCU-1 210 sends a request to the MCU-2 220 to relinquish control of the CAN communication of the MCU system 200, as shown at 335. Alternatively, if the IMC status information indicates that the MCU-1 210 is configured as the source MCU of the MCU system 200, the MCU-1 210 checks CAN messages being transmitted by the MCU-2 220, as shown at 340.

If MCU-2 220 is transmitting messages, when the MCU-1 210 is set as the source MCU, an error message is generated and reported as shown at 345. Alternatively, if no messages are seen from the MCU-2 220, the MCU-1 210 takes over the control of the CAN messages of the MCU system 200, and updates the IMC status information to indicate that the control has been taken, as shown at 350.

Further, in case the IMC status information is determined to be invalid, the MCU-1 210 checks the CAN bus for messages being sent by the MCU-2 220, as shown at 325. If the MCU-2 220 is not sending any CAN messages, the MCU-1 210 takes over control of the CAN communication and updates the IMC status information to indicate that the control has been taken, as shown at 350. Alternatively, if the MCU-2 220 is sending CAN messages, the MCU-1 210 sends a request to the MCU-2 220 to relinquish control of the CAN communication, as shown at 335.

Upon sending the request to the MCU-2 220 for relinquishing control of the CAN communication, the MCU-1 210 monitors the CAN bus to check status of the messages being sent by the MCU-2 220, as shown at 360. The MCU-1 210 checks if the MCU-2 220 does not relinquish control, that is does not stop sending CAN messages, within a predetermined timeout period since sending the request to relinquish control, as shown at 355. For example, if the MCU-2 220 sends messages even after the timeout period, the MCU-1 210 reports an error as shown at 345.

Alternatively, if the MCU-2 220 stops sending CAN messages within the timeout period, the MCU-1 210 ensures that the IMC status information indicates that the CAN communication control has been relinquished, as shown at 370. If the IMC status information still indicates that the MCU-2 220 has not relinquished control of the CAN communication, the MCU-1 210 issues an error signal, as shown at 345. Alternatively, if the status information indicates that the MCU-2 220 has relinquished the control of the CAN communication, the MCU-1 210 takes over the control of the CAN messages of the MCU system 200, and updates the IMC status information to indicate that the control has been taken, as shown at 350.

Figure 4:
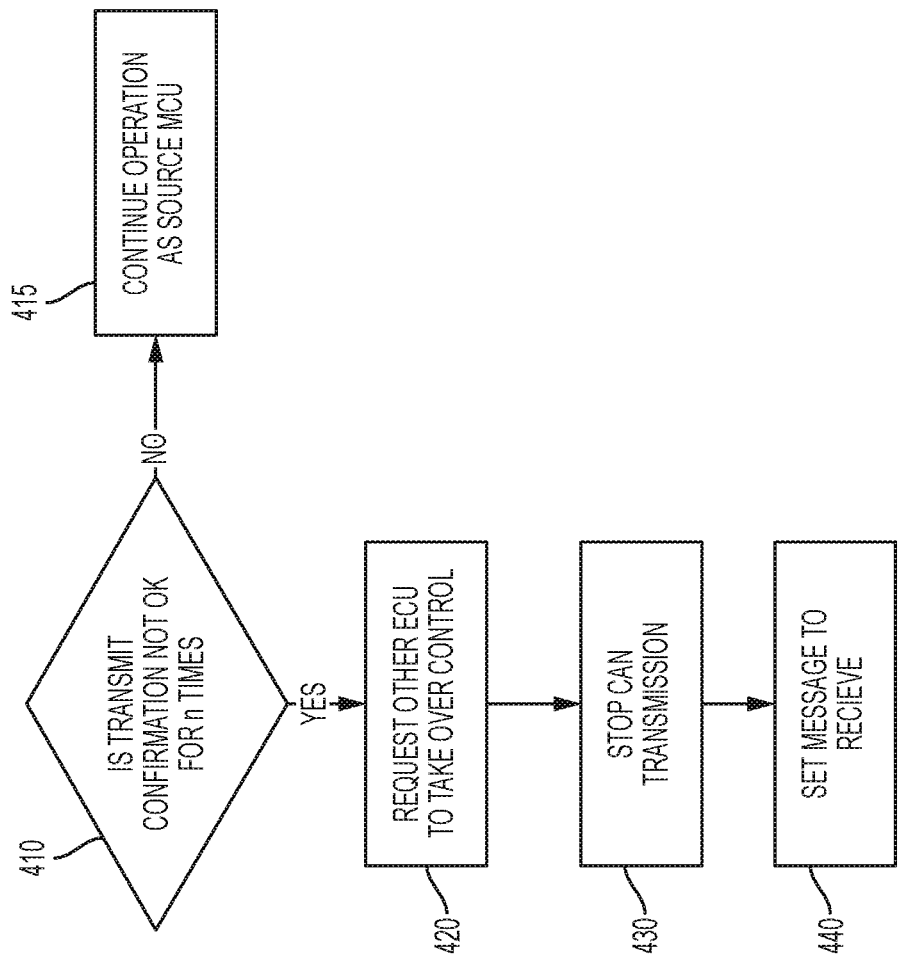
FIG. 4 illustrates a flowchart of an example method for a source MCU to request a backup MCU to take over CAN communication control according to one or more embodiments.

FIG. 4 illustrates a flowchart of an example method for a source MCU to request a backup MCU to take over CAN communication control according to one or more embodiments. Consider that the MCU-1 210 is the source MCU and the MCU-2 220 is the backup MCU in the MCU system 200. The MCU-1 210 monitors transmission acknowledgements every time the MCU-1 210 transmits a CAN message. In one or more examples, the MCU-1 210 checks whether transmission acknowledgement has not been received for at least a predetermined number of successive transmissions, as shown at 410. If the transmission acknowledgement is received, the MCU-1 210 continues operation as the source MCU.

Alternatively, in case the acknowledgement is not received for at least the predetermined successive transmissions, the MCU-1 210 requests the MCU-2 220 to take over control of the CAN communications via the IMC 230, as shown at 420. The MCU-1 210 further stops transmission of CAN messages over the CAN bus-1 215, as shown at 430. Stopping the transmission further includes marking the CAN messages as receivable by the MCU-1 210, as shown at 440.

Figure 5:
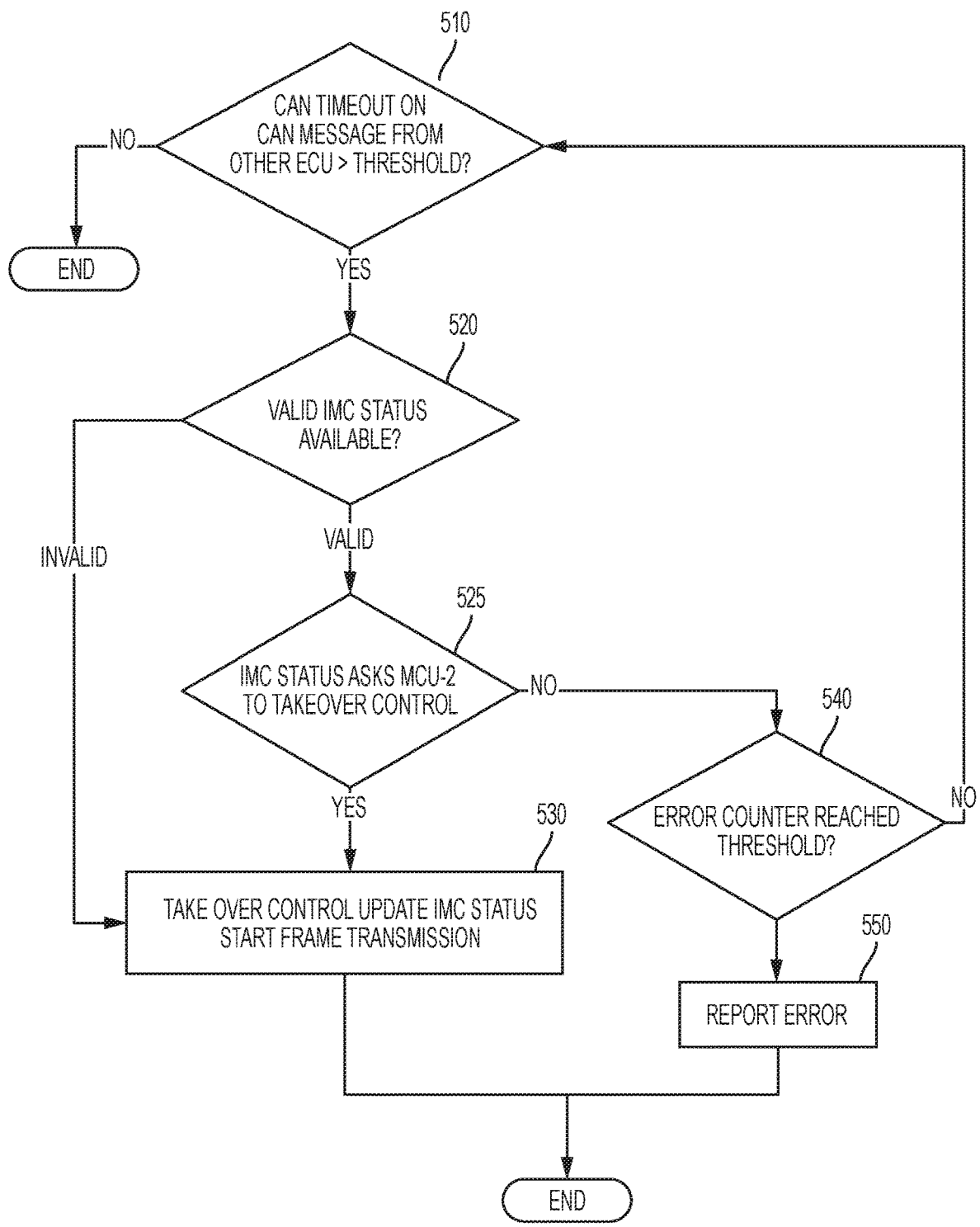
FIG. 5 illustrates a flowchart of an example method for requesting a source MCU to release control of CAN communication according to one or more embodiments.

FIG. 5 illustrates a flowchart of an example method for requesting a source MCU to release control of CAN communication according to one or more embodiments. Again, consider that the MCU-1 210 is the source MCU and the MCU-2 220 is the backup MCU in the MCU system 200. The backup MCU, in this case the MCU-2 220 monitors the CAN communications being sent by the source MCU, in this case the MCU-1 210. The MCU-2 220 checks to see if a CAN message from the source MCU has not been transmitted for a duration above a predetermined threshold, as shown at 510. If transmission of messages by the MCU-1 210 is operating per the predetermined threshold, the MCU-2 220 continues operating as the backup MCU. Alternatively, if a duration between two successive transmissions from the MCU-1 210 is above the predetermined duration, for example 1 second, 100 milliseconds, or the like, the MCU-2 220 checks the IMC status of the MCU-1 210 via the IMC 230, as shown at 520.

If the IMC status of the MCU-1 210 over the IMC 230 is invalid, the MCU-2 220 takes over control of the CAN communication, as shown at 530. The MCU-2 220 further updates the IMC status to indicate that the MCU-2 220 is now the source MCU of the MCU system 200. The MCU-2 220 further starts transmission of the CAN messages.

Alternatively, if the IMC status of the MCU-1 210 is valid, the MCU-2 220 checks if the IMC status is a request for the MCU-2 220 to take over control of the CAN communication, as shown at 525. If so, the MCU-2 220 takes over control of the CAN communication and updates the IMC status accordingly, as shown at 530. If the IMC status does not request the MCU-2 220 to take over control of the CAN communication, the MCU-2 220 checks if number of erroneous communications from the MCU-1 210 has crossed a predetermined threshold, as shown at 540. For example, the MCU-2 220 keeps track of a number of times communication from the MCU-1 210 has timed out. The MCU-2 220 increments a counter every time the communication from the MCU-1 210 times out.

If the error threshold has not been exceeded, the MCU-2 220 repeats the method and again monitors for a timeout of the communication from the MCU-1 210, as shown at 510. Instead, if the error threshold has been met or exceeded, the MCU-2 220 reports an error, as shown at 550.

FIG. 3 illustrates a flow chart of an example method for startup of an MCU in a redundant MCU system according to one or more embodiments. Consider that the MCU-1 210 of the MCU system 200 is starting up with the MCU-2 220 acting as the source MCU of the system 200 while the MCU-1 210 was restarting. It should be noted that in a similar manner the method is applicable when the MCU-2 220 restarts in other examples. In this case, the MCU-1 210 sets up all the CAN messages as receivable for both the MCU-1 210 and the MCU-2 220, as shown at 310. MCU-1 210 further checks if a valid status is available via the IMC 230, as shown at 320. If the IMC status is invalid, the MCU-1 210 monitors if the MCU-2 220 is transmitting messages via the CAN bus, as shown at 325. For example, the MCU-1 210 checks fir a predetermined duration whether any CAN messages are being transmitted by the MCU-2 220.

If the IMC status is invalid, and MCU-2 220 is not transmitting any CAN messages, the MCU-1 210 takes over control of the CAN communications of the MCU system 200, as shown at 350. For example, the MCU-1 210 configures itself as the source MCU and updates the IMC status to indicate that the MCU-1 210 is the source MCU and the MCU-2 220 as the backup MCU. Further, taking over control includes updating the status of the CAN messages of the MCU-1 210 as transmittable while maintaining the status of CAN messages as receivable at the MCU-2 220.

In case the IMC status is invalid, and if the MCU-1 210 detects that the MCU-2 220 is sending messages via the CAN bus, the MCU-1 210 sends a request to the MCU-2 220 to relinquish control, as shown at 335. In one or more examples, the request is sent via the IMC channel 230. The MCU-1 210 continues to wait for a predetermined timeout period after sending the request. During the predetermined timeout period, the MCU-1 210 monitors if the MCU-2 220 has stopped sending CAN messages, as shown at 355 and 360. If the MCU-2 220 stops sending the CAN messages, the MCU-1 210 checks if the IMC status has been set to indicate that communication control has been released by MCU-2 220, as shown at 370. If the IMC status indicates that the control has been released, the MCU-1 210 takes over control of the CAN communication of the MCU system 200, as shown at 350 and updates the IMC status accordingly.

If the MCU-1 210 determines that the MCU-2 220 has stopped sending messages after receiving the request to relinquish control, however that the IMC status does not indicate that the control has been released, the MCU-1 210 reports an error, as shown at 345. In one or more examples, the error is reported by sending a communication signal to the vehicle central computer and/or other ECUs in the vehicle. Alternatively, the MCU-1 210 also reports an error in case the predetermined timeout period runs out without the MCU-2 220 stopping transmission of the CAN messages, as shown at 355.

Alternatively yet, in case the IMC status that the MCU-1 210 determined on startup is valid, the MCU-1 210 checks if the IMC status indicates that the MCU-2 220 is acting as the source MCU of the MCU system 200, as shown at 330. If the IMC status indicates that the MCU-2 220 is acting as the source MCU of the MCU system 200, the MCU-1 210 sends to the MCU-2 220 the request to relinquish control, as shown at 335. In one or more examples, the request is sent via the IMC channel 230. The MCU-1 210 continues to wait for a predetermined timeout period after sending the request. During the predetermined timeout period, the MCU-1 210 monitors if the MCU-2 220 has stopped sending CAN messages, as shown at 355 and 360. If the MCU-2 220 stops sending the CAN messages, the MCU-1 210 checks if the IMC status has been set to indicate that communication control has been released by MCU-2 220, as shown at 370. If the IMC status indicates that the control has been released, the MCU-1 210 takes over control of the CAN communication of the MCU system 200, as shown at 350 and updates the IMC status accordingly.

As described before in case of the invalid IMC status, in this case with the valid IMC status, if the MCU-1 210 determines that the MCU-2 220 has stopped sending messages after receiving the request to relinquish control, however that the IMC status does not indicate that the control has been released, the MCU-1 210 reports an error, as shown at 345. In one or more examples, the error is reported by sending a communication signal to the vehicle central computer and/or other ECUs in the vehicle. Alternatively, the MCU-1 210 also reports an error in case the predetermined timeout period runs out without the MCU-2 220 stopping transmission of the CAN messages, as shown at 355.

Alternatively, in case the IMC status is valid, and if the IMC status is not indicative that the MCU-2 220 is the source MCU, the MCU-1 210 monitors the CAN bus to check if MCU-2 220 is sending CAN messages, as shown at 340. If MCU-1 210 finds that the MCU-2 220 is not sending messages, the MCU-1 210 takes over control and updates the IMC status, as shown at 350. If the MCU-2 220 is sending messages, and the IMC status indicates that MCU-2 220 is not the source MCU, the MCU-1 210 reports the error, as shown at 345.

FIG. 4 illustrates a flow chart of an example method for an MCU to request a backup MCU to take over control of communication of the MCU system according to one or more embodiments. For sake of this example, consider that the MCU-1 210 is the source MCU requesting the MCU-2 220 as the backup MCU to takeover the control. It should be noted that in other examples, the MCU-2 220 implements the method in a similar manner.

The MCU-1 210 monitors a transmission confirmation messages received in response to transmissions of CAN messages by the MCU-1 210, as shown at 410. If for a predetermined number of times, such as n, the MCU-1 210 does not receive a transmission confirmation, the MCU-1 210 deems that CAN transmission is experiencing a failure/fault. In one or more examples, the predetermined times is a successive n times. If the MCU-1 210 does not detect at least the predetermined number of transmission errors, the MCU-1 210 continues operation as the source MCU as shown at 415.

If the erroneous transmission confirmations are detected for at least the predetermined number of times, the MCU-1 210 sends a request to the MCU-2 220 to take over communication control, as shown at 420. In one or more examples, the request is sent via the IMC channel 230. The MCU-1 210 further stops transmission of the CAN messages itself, as shown at 430. Further, the MCU-1 210 sets all the messages to be receivable so as to monitor the transmissions by the MCU-2 220, as shown at 440.

FIG. 5 illustrates a flowchart of an example method for requesting a source MCU to release/relinquish control according to one or more embodiments. Consider that the MCU-1 210 is acting as the source MCU and the backup MCU, MCU-2 220 sends the request. In other examples, the MCU-1 210 may send the request in a similar manner. The MCU-2 220 monitors the transmissions by the MCU-1 210 to ensure that the transmission is operative. If the MCU-2 220 detects that no CAN message has been sent by the MCU-1 210 for at least a predetermined duration, the MCU-2 220 determines that the MCU-1 210 may be experiencing an error, as shown at 510. If such a condition is not detected, the MCU-2 220 continues to operate as the backup MCU and to monitor the transmission from the MCU-1 210.

If the condition is detected, the MCU-2 220 checks the status of the MCU system 200 on the IMC channel 230 to check if the MCU-1 210 has indicated of an error, as shown at 520. If the status is invalid, the MCU-2 220 takes over control of the CAN communications of the MCU system 200, as shown at 530. Alternatively, if the IMC status is valid, the MCU-2 220 checks what the IMC status indicates, as shown at 525. If the IMC status indicates that the MCU-1 210 indicates the MCU-2 220 to take over control, the MCU-2 220 takes over the control of the CAN communication, as shown at 530. In one or more examples, taking over control includes updating the IMC status to indicate that MCU-2 220 is the source MCU of the MCU system 200. Further, in one or more examples, taking over the control includes initiating transmission of the CAN messages and setting the CAN messages as receivable by the MCU-1 210 and transmittable by the MCU-2 220.

Alternatively, if the IMC status is not indicative of a request for the MCU-2 220 to take over control, the MCU-2 220 increments an error counter. The MCU-2 220 maintains the error counter to monitor a number of times the MCU-2 220 waits for the MCU-1 210 to communicate messages over the CAN bus. For example, waiting for a predetermined number of times facilitates the MCU-2 220 to avoid taking over control of the CAN communication in case the MCU-1 210 is restarting or has been delayed by an application specific delay. Until the error counter reaches the predetermined threshold, the MCU-2 220 continues to monitor the timeouts of the MCU-1 210. If the error counter exceeds the predetermined threshold, the MCU-2 220 reports the error, as shown at 550.

Figure 6:
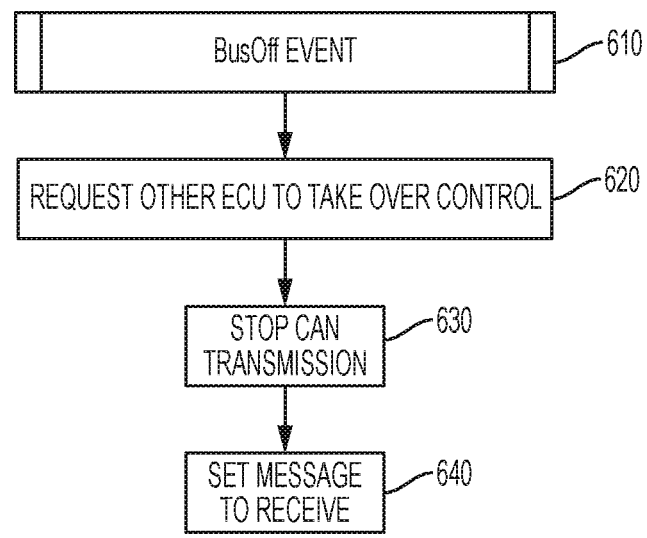
FIG. 6 illustrates a flowchart of an example method for handling bus-off scenario by a source MCU of a redundant MCU system according to one or more embodiments.

FIG. 6 illustrates a flowchart of an example method for handling bus-off scenario by a source MCU of a redundant MCU system according to one or more embodiments. If the MCU-1 210 is the source MCU, the MCU-1 210 monitors if a bus-off event occurs, as shown at 610. The bus-off event indicates an error in the CAN bus, bus-1 215, in this case. For example, the bus-off event may occur if the CAN bus-1 215 experiences a failure, such as a breakage. In response to the bus-off event, the MCU-1 210 sends a request to the backup MCU, say the MCU-2 220 to take over the control of the CAN communications, as shown at 620. The MCU-1 210 sends the request via the IMC channel 230. For example, the request is sent by changing the IMC status to request the MCU-2 220 to become the source MCU. Further, MCU-1 210 stops sending the CAN transmissions and sets messages as receivable, as shown at 630 and 640. In one or more examples, the MCU-1 210 monitors the CAN bus and the IMC channel 230 to ensure that the MCU-2 220 takes over the control. In case the MCU-2 220 does not take over control and start transmitting messages, the MCU-1 210 reports an error. It should be noted that although the above example is described as being implemented by the MCU-1 210, the MCU-2 220 may implement the method in other examples.

Figure 7:
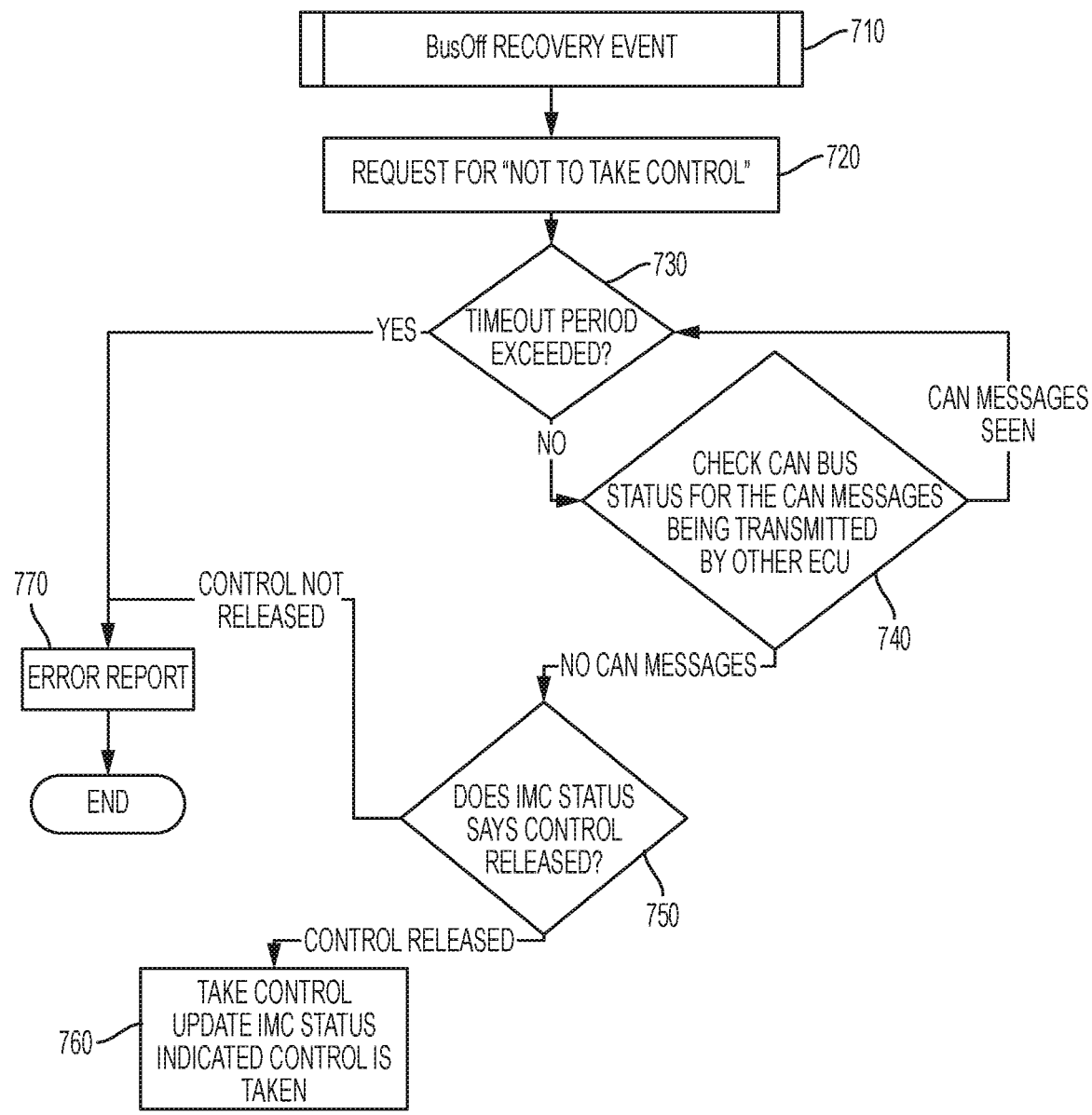
FIG. 7 illustrates a flowchart of an example method for a bus-off recovery event according to one or more embodiments.

FIG. 7 illustrates a flowchart of an example method for a bus-off recovery event according to one or more embodiments. A bus-off recovery event occurs when an MCU recovers from an error/failure of the CAN bus. The following example is depicted as MCU-1 210 implementing the method, however in other examples, the MCU-2 220 may implement the method. The MCU-1 210 monitors the CAN bus-1 215 to determine if an error has been recovered. In case a bus-off recovery event is identified, the MCU-1 210 sends a request to the MCU-2 220 to not take over control of the communication, as shown at 710 and 720. The MCU-1 210 monitors the CAN bus for a predetermined timeout period after sending the request to check if the MCU-2 220 is sending CAN messages, as shown at 730 and 740. The MCU-1 210 continues to wait for at least the predetermined timeout period in case CAN messages are detected from the MCU-2 220, as shown at 730 and 740. If even after the timeout period, the MCU-2 220 is sending CAN messages, the MCU-1 210 reports an error, as shown at 770.

If the MCU-2 220 stops sending CAN messages within the predetermined timeout period since receiving the request from the MCU-1 210, the MCU-1 210 checks the IMC status, as shown at 750. If the IMC status indicates the MCU-2 220 has not yet released control of the CAN communications, the MCU-1 210 reports the error, as shown at 770. If the MCU-2 220 has released control, the MCU-1 210 takes over control of the CAN communication and updates the IMC status to indicate that it is the source MCU, as shown at 760.

FIG. 8 depicts an example IMC status information data structure 800 according to one or more embodiments. In one or more examples, the IMC status data structure 800 includes a field to indicate that the source MCU is in control of CAN bus-1 210. The IMC status data structure 800 further includes a field to indicate if the source MCU is in control of the CAN bus-2 225. The IMC status data structure 800 further includes a field that indicates if the backup MCU is in control of the CAN bus-1 215. The IMC status data structure 800 further includes a field that indicates if the backup MCU is in control of the CAN bus-2 225.

The IMC status data structure 800 further includes a field that indicates if the backup MCU is requesting control of the CAN bus-1 215. The IMC status data structure 800 further includes a field indicative if the backup MCU is requesting control of the CAN bus-2 225.

The IMC status data structure 800 further includes a field indicating that the source MCU is denying control of CAN bus-1 210. The IMC status data structure 800 further includes a field indicating that the source MCU is denying control of the CAN bus-2 225.

The IMC status data structure 800 further includes a field indicating that the source MCU is requesting the backup MCU to take over control of the CAN bus-1 215. The IMC status data structure 800 further includes a field indicating that the source MCU is requesting the backup MCU to take over control of the CAN bus-2 225.

The example IMC status data structure 800 uses a bit for each field. For example, the IMC status data structure 800 includes 10 bits. However, it should be noted that in other examples, a field of the IMC status data structure 800 includes additional bits such as a byte, a pair of bits, or any other number of bits. It should be noted that while the example data structure indicates specific field positions, in other examples, the field positions used are different from those depicted. In other examples, the data structure may include additional fields than those depicted herein.

By implementing the technical solutions described herein, a redundant MCU system, such as in a vehicle provides robust, efficient, and consistent detection of a CAN failure; a smooth and quick takeover of control of CAN communication by a backup MCUs in response to a failure condition of a source MCU; and a smooth return of control of the CAN communication to the source MCU upon failure recovery. In one or more examples, the redundant MCU system is used as a control module of a power steering system, or any other vehicle subsystem. Although the embodiments described herein use a redundant MCU system in a steering system as example implementations, it is understood that the redundant MCU system may be any redundant processor architecture that includes a processing unit with two or more processors, a first processor being used as a primary processor and the other processor as a backup processor that takes control as the primary processor in case of a failure at the first processor.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, ... and <N>" or "at least one of <A>, <B>, ... <N>, or combinations thereof" or "<A>, <B>, ... and/or <N>" are to be construed in the broadest sense, superseding any other implied definitions hereinbefore or hereinafter unless expressly asserted to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed:

1. A processing unit for providing a redundant processor, the processing unit comprising:
    a source processor coupled with a system communication bus via a first communication line;
    a backup processor coupled with the system communication bus via a second communication line; and
    an inter-microprocessor communication channel for communication between the source processor and the backup processor;
    the backup processor being configured to:
        monitor for a failure of the source processor by monitoring the first communication line for communication messages being transmitted by the source processor;
        determine a failure of the source processor in response to an absence of the communication messages on the first communication line for a predetermined duration; and
        in response to a failure of the source processor, take over control of communication of the processing unit by sending a status update on the inter-microprocessor communication channel, the status update indicating that the backup processor has taken control of the communication for the processing unit.

2. The processing unit of claim 1, wherein monitoring for the failure of the source processor further comprises monitoring the inter-microprocessor communication channel for a status update from the source processor indicating a failure.

3. The processing unit of claim 1, wherein the backup processor is further configured to monitor for a recovery by the source processor and relinquish control of the communication of the processing unit in response.

4. The processing unit of claim 3, wherein the backup processor monitors for the recovery of the source processor by monitoring for a request to relinquish control over the inter-microprocessor communication channel.

5. The processing unit of claim 3, wherein the backup processor is configured to relinquish control of the communication for the processing unit by sending a status update via the inter-microprocessor communication channel, the status update indicative of the backup processor no longer controlling the communication.

6. The processing unit of claim 1, the source processor in response to restarting is configured to:
    check if the backup processor is in control of the communication of the processing unit;
    in response to the backup processor controlling the communication, sending a request to the backup processor to relinquish control of the communication; and
    taking over control of the communication in response to the backup processor relinquishing control of the communication.

7. The processing unit of claim 6, wherein the source processor is further configured to wait for a predetermined duration after sending the request to the backup processor to relinquish control of the communication.

8. The processing unit of claim 6, wherein checking if the backup processor is in control of the communication comprises checking the status from the inter-microprocessor communication channel.

9. A method for uninterrupted data communication from a processing system, the method comprising:
    monitoring, by a second processor, for a failure of a first processor by monitoring a first communication line associated with the first processor for communication messages being transmitted by the first processor;
    determining, by the second processor, the failure of the first processor in response to an absence of the communication messages on the first communication line for a predetermined duration; and
    in response to the failure of the first processor, taking over control of communication of the processing system by the second processor, by sending a status update on an inter-microprocessor communication channel between the first processor and the second processor, the status update indicating that the second processor has taken control of the communication for the processing system.

10. The method of claim 9, wherein monitoring for the failure of the first processor further comprises monitoring, by the second processor, the inter-microprocessor communication channel for a status update from the first processor indicating a failure.

11. The method of claim 9, further comprising monitoring, by the second processor, for a recovery of the first processor and relinquishing control of the communication of the processing system in response to the recovery.

12. The method of claim 11, the monitoring monitors for the recovery of the first processor comprises monitoring, by the second processor, for a request from the first processor to relinquish control, the request received via the inter-microprocessor communication channel.

13. The method of claim 11, wherein relinquishing control of the communication for the processing system by the second processor comprises sending, by the second processor, a status update via the inter-microprocessor communication channel, the status update indicative of the second processor no longer controlling the communication.

14. The method of claim 9, further comprising, restarting, by the first processor, in response to recovery from the failure, the restarting comprising:
   checking, by the first processor, if the second processor is in control of the communication of the processing system;
   in response to the second processor controlling the communication, sending, by the first processor, a request to the second processor to relinquish control of the communication; and
   taking over control of the communication, by the first processor, in response to the second processor relinquishing control of the communication.

15. A computer program product comprising non-transitory computer storage medium that comprises computer executable instructions, the computer executable instructions when executed by a processing system causes the processing system to:
   monitor, by a second processor of the processing system, for a failure of a first processor of the processing system by monitoring a first communication line associated with the first processor for communication messages being transmitted by the first processor;
   determine, by the second processor, the failure of the first processor in response to an absence of the communication messages on the first communication line for a predetermined duration; and
   in response to the failure of the first processor, take over control of communication of the processing system by the second processor, by sending a status update on an inter-microprocessor communication channel between the first processor and the second processor, the status update indicating that the second processor has taken control of the communication for the processing system.

16. The computer program product of claim 15, wherein monitoring for the failure of the first processor further comprises monitoring, by the second processor, the inter-microprocessor communication channel for a status update from the first processor indicating a failure.

17. The computer program product of claim 15, the computer executable instructions further causing the processing system to:
   monitor, by the second processor, for a recovery of the first processor; and
   relinquish control of the communication of the processing system in response to the recovery.

18. The computer program product of claim 15, the computer executable instructions further causing the processing system to:
   restart the first processor for recovery from the failure, the restart comprising: checking, by the first processor, if the second processor is in control of the communication of the processing system;
   in response to the second processor controlling the communication, sending, by the first processor, a request to the second processor to relinquish control of the communication; and
   taking over control of the communication, by the first processor, in response to the second processor relinquishing control of the communication.

* * * * *